LEE ROY HOLT.
COTTON SEED DELINTER.
APPLICATION FILED MAY 27, 1916.

1,247,679.

Patented Nov. 27, 1917.
2 SHEETS—SHEET 1.

LEE ROY HOLT.
COTTON SEED DELINTER.
APPLICATION FILED MAY 27, 1916.

1,247,679.

Patented Nov. 27, 1917.
2 SHEETS—SHEET 2.

UNITED STATES PATENT OFFICE.

LEE ROY HOLT, OF ALBANY, GEORGIA.

COTTON-SEED DELINTER.

1,247,679.　　　　Specification of Letters Patent.　　Patented Nov. 27, 1917.

Application filed May 27, 1916. Serial No. 100,369.

*To all whom it may concern:*

Be it known that I, LEE R. HOLT, a citizen of the United States, residing at Albany, in the county of Dougherty and State of Georgia, have invented certain new and useful Improvements in Cotton-Seed Delinters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cotton-seed delinters and particularly to the type employing gin saws to remove the lint from the seed, and has for its objects to expedite the delinting operation and effectively remove the lint from the seed; to compensate for the wear of the saws to prevent the seed escaping from the hopper before proper treatment; and to prevent the overflow of the seed from the hopper during the delinting operation.

Figure 1:
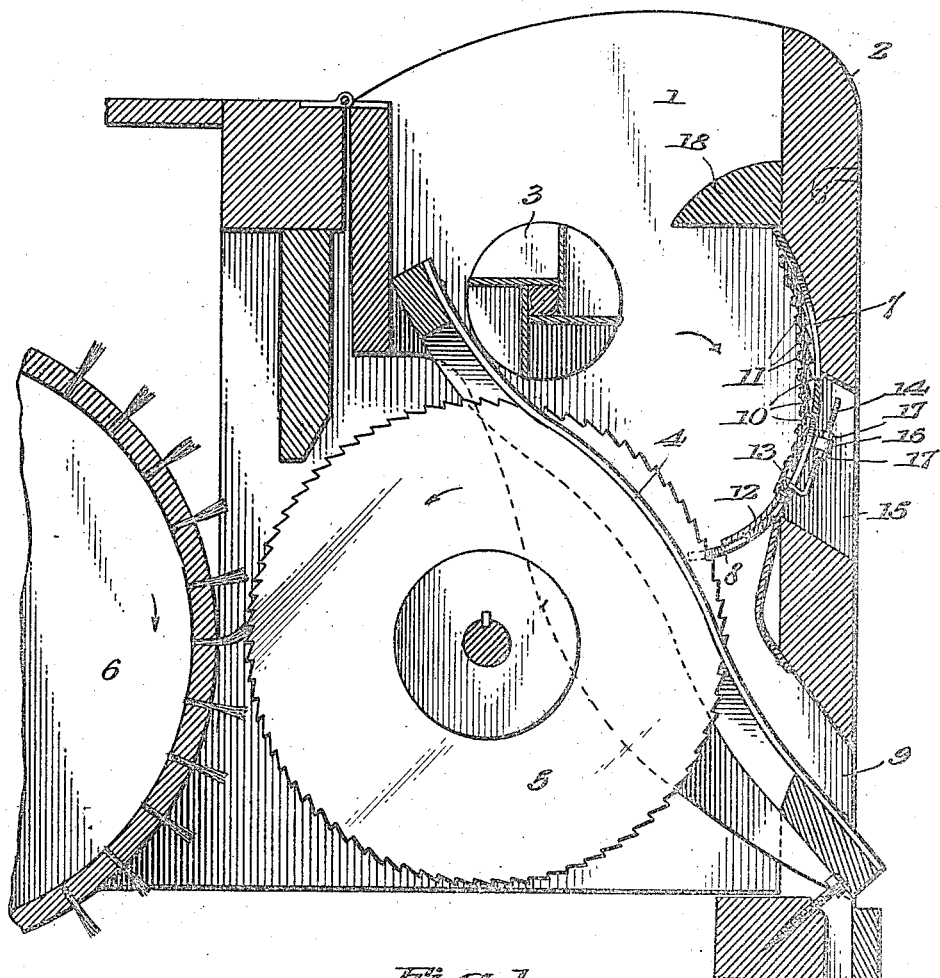
Figure 2:
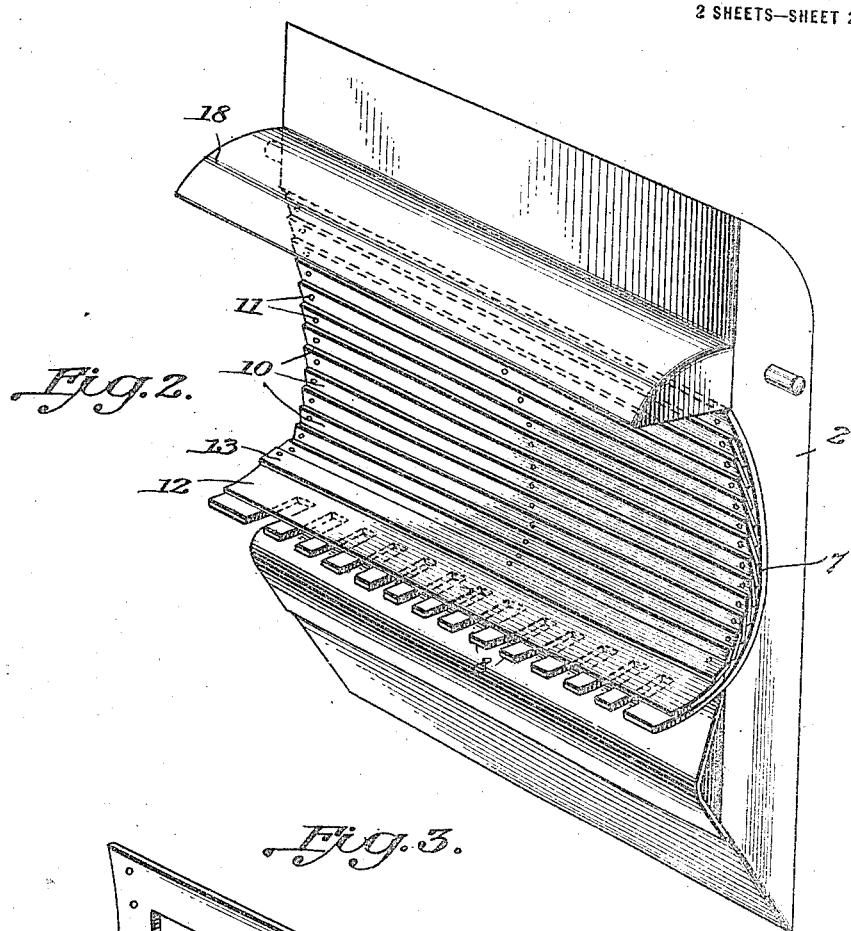

To the accomplishment of the foregoing objects and such others as may hereinafter appear, the invention consists in the features hereinafter described and then sought to be clearly defined by the claims, reference being had to the accompanying drawings in which Figure 1 is a vertical section of a delinter embodying my invention;

Fig. 2 a perspective of the delinter breast; and

Figure 3:
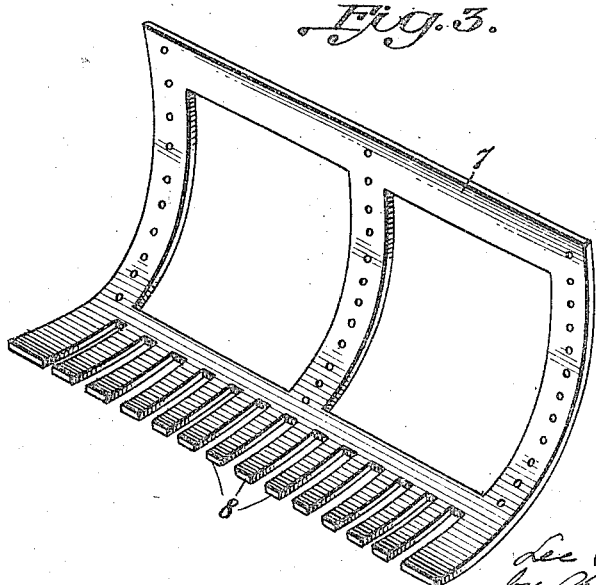

Fig. 3 a perspective of the scraper bar supporting-frame, detached.

In the drawings, the numeral 1 indicates the hopper for receiving the cottonseed to be delinted and is provided with a removable breast 2, a winged roller 3, and gin ribs 4 between which the gin saws 5 project into the hopper, the saws being mounted in the usual way and driven by any suitable means. The usual brush 6 is arranged to rotate in contact with the saws in the opposite direction and at a greater rate of speed to remove the lint therefrom which is conveyed to a suitable place for deposit in the usual manner. As the foregoing elements and their relation are well known in the art, a further description is deemed unnecessary.

A frame 7, formed to fit the breast 2 to which it is suitably attached, is provided at its lower side with fingers 8 which pass between the saws 4 and are properly spaced from the gin ribs 3 to permit the delinted seed to pass out of the hopper and be discharged through the opening 9 at the bottom of the delinter frame. A series of overlapping scraper bars 10 are secured to the frame 7 by rivets 11 or other suitable fastenings to provide a stepped or ribbed scraping surface with which the seed come in contact as the seed roll is revolved. The stepped surface together with the saws will expedite and insure the effective removal of the lint from the seed. The lint thus detached will be separated from the seed by the saws and carried out of the hopper. The scraper bars 10 are preferably flat or rectangular in cross section and may be detached from the frame 7 by removing the fastenings 11 and turned to present another sharp edge when the one in use becomes worn or dulled, thereby permitting each edge to be used before it will be necessary to provide other bars.

A plate 12, adjustable with relation to the saws 4, is slidably supported between the fixed plate 13 and the lower side of the frame 7 in contact with the fingers 8, and has adjusting means connected therewith, preferably at each end, and which may consist of a threaded rod 14 which projects into and is accessible through an opening 15 provided in the breast 2 of the hopper. The plate 12 is held at its adjusted position by an apertured block 16 secured to each end of the frame 7, through which the rod 14 freely passes and is held against movement or to its adjustment by the members 17 which are threaded to fit the rod and adapted to be moved into contact with opposite sides of the block 16 when the plate 12 has been adjusted to its proper position with relation to the saws. As the saws become worn through use or sharpening and decrease in diameter, the plate 12 is adjusted toward them to prevent the seed passing out of the hopper between the edge of the saws and the back edge of the slots between the fingers 8.

An inwardly projecting or deflector bar 18 is arranged within the hopper 1 upon the breast 2 and extends adjacent to the winged roller 5 forming a throat or restricted opening through which the seed to be treated are placed in the hopper and serves to prevent the seed from being forced upward and out or overflowing the same, and directs the seed into contact with the scraper bars which remove the lint therefrom as hereinbefore described.

It will be understood from the foregoing that the treatment of the seed will be materially expedited and that it will be discharged from the delinter practically free of lint. Changes can be made in details of the parts and essential features of the invention retained.

Having thus described my invention, what I claim is:

1. In a cotton-seed delinter, a hopper, a breast for the hopper provided with a step-like formation scraper surface, the breast and scraper constituting an upright, step-like, concave wall to the hopper spaced a substantial distance in front and above the delinting saws, and a deflector positioned at the upper end of the scraper surface and projected forwardly into the hopper in the direction of the saws to confine and direct the seed toward the scraper surface.

2. In a cotton-seed delinter, a hopper, and a breast for said hopper provided with a plurality of overlapping scraper bars.

3. In a cotton-seed delinter, a hopper, and a breast for said hopper having a plurality of scraper bars secured thereto to form a step-like serrated scraper surface, said breast and scraper bars constituting an upright, steplike, concave wall to the hopper spaced a substantial distance in front and above the delinting saws.

4. In a cotton-seed delinter, a hopper, a breast for said hopper, a frame secured to said breast, and a plurality of overlapping scraper bars secured to said frame.

5. In a cotton-seed delinter, a hopper, a breast for said hopper, a frame secured to said breast and formed with a series of fingers at its lower end, and a plurality of over-lapping scraper bars secured to said frame.

6. In a cotton-seed delinter, a hopper, a breast for the hopper, saws projecting into said hopper, a frame provided with a series of fingers projecting between the saws attached to said breast, and a plate secured to said frame and adjustable with relation to said fingers and saws to compensate for wear of the saws.

7. In a cotton-seed delinter, a hopper, a breast provided with over-lapping scraper bars, the breast and scraper bars constituting an upright, steplike, concave wall to the hopper spaced a substantial distance in front and above the delinting saws, and a deflector positioned above the scraper bars and projected forwardly from the breast toward the opposite side of the hopper in the direction of the saws to confine and direct the seed toward the scraper bars.

8. In a cotton-seed delinter, a hopper, a breast for the hopper provided with a curved and serrated scraper surface, the breast and serrated surface constituting an upright, steplike, concave wall to the hopper spaced a substantial distance in front and above the delinting saws, a deflector to the breast overhanging the upper end of the scraper surface and projecting inwardly into the hopper in the direction of the saws, and a winged roller positioned opposite to the scraper surface and adjacent to the inner edge of the deflector to form a relatively narrow throat passage-way between the deflector and roller for directing the cotton-seed toward the scraper surface.

In testimony whereof I affix my signature in presence of two witnesses.

LEE ROY HOLT.

Witnesses:
C. C. GAUGHF,
R. L. CRAWFORD.